UNITED STATES PATENT OFFICE.

ISAAC WATERMAN, OF LONDON, CANADA.

IMPROVEMENT IN CEMENTS FOR COATING OIL-BARRELS AND TANKS.

Specification forming part of Letters Patent No. 116,651, dated July 4, 1871.

*To all whom it may concern:*

Be it known that I, ISAAC WATERMAN, of the city of London, county of Middlesex and Province of Ontario, Canada, have invented a certain compound or composition to be used for the inside of barrels, &c., to be known as "Waterman's Unparalleled Barrel Cement."

The nature of the invention consists in cementing the interior of barrels, boxes, or similar packages made of any kind of wood, more especially barrels containing petroleum and other oils, liquids, and substances, to prevent leakage; and the invention consists in mixing together certain well-known substances, and forming them into a cement for this purpose, as will be hereinafter fully described.

It is well known that oils penetrate the hardest woods, and that in barrels containing them the leakage is at least estimated at three per cent. It is known that petroleum is one of the most volatile as well as penetrating oils, and the loss by shipping in barrels is very great. The object of my invention is to prevent the leakage of petroleum-barrels, which are usually made of white oak, but by the use and application of my cement any kind of wood, even pine, may be used with perfect certainty that no leakage will ensue, and barrels so treated will last for any length of time.

The "Unparalleled Barrel Cement" is made from a mixture of glue, plaster of Paris, hydriodate or iodide of potassium, alum, and water, in about the following quantities and proportions, viz.: To fifty (50) pounds of glue are added sixteen (16) pounds of plaster of Paris, ten (10) ounces of alum, three-eighths ($\frac{3}{8}$) of an ounce of hydriodate or iodide of potassium, and with these a sufficient quantity of water to give the required thickness. The composition or cement is produced by mixing these component parts together and boiling. It is applied while in a boiling state to the barrels, and is put on as thick or thin as may be desired.

It penetrates the wood at once, filling up all the pores or cells, and dries quickly, presenting a hard and almost indestructible surface, which is with difficulty, even, scraped off. It is not affected by any temperature of weather. It does not crack or scale off in handling. It keeps the barrel perfectly sweet, and does not effect the liquid, oils, &c., contained in the barrels so treated or coated. It is principally intended for barrels to hold petroleum, and the petroleum-oil has the effect of hardening the cement still more; whereas glue, which is generally used, is dissolved by it, and sometimes injures the contents of the barrels.

What I claim as my invention is—

The barrel cement, herein shown and described, consisting of alum, iodide of potassium, glue, plaster of Paris, and water, compounded in the manner and about the proportions specified.

In witness whereof I have hereunto signed my name in the presence of two subscribing witnesses.

I. WATERMAN.

Witnesses:
J. K. DRAKE,
HIRAM EXSTEIN.